(12) United States Patent
Ichihashi et al.

(10) Patent No.: US 8,379,640 B2
(45) Date of Patent: Feb. 19, 2013

(54) INTERNETWORK DEVICE

(75) Inventors: Masataka Ichihashi, Yokohama (JP); Shinji Katsume, Isehara (JP); Tomoyuki Sako, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 267 days.

(21) Appl. No.: 12/816,501

(22) Filed: Jun. 16, 2010

(65) Prior Publication Data

US 2010/0322247 A1 Dec. 23, 2010

(30) Foreign Application Priority Data

Jun. 17, 2009 (JP) ................................ 2009-144073
Sep. 25, 2009 (JP) ................................ 2009-219903

(51) Int. Cl.
*H04L 12/28* (2006.01)

(52) U.S. Cl. ......... 370/389; 370/392; 370/400; 370/401

(58) Field of Classification Search .................. 370/389, 370/392, 394, 400, 401, 407

See application file for complete search history.

(56) References Cited

U.S. PATENT DOCUMENTS

| | | | |
|---|---|---|---|
| 6,772,226 B1 * | 8/2004 | Bommareddy et al. ...... | 709/245 |
| 7,042,876 B1 * | 5/2006 | Jayasenan et al. ............ | 370/389 |
| 7,716,370 B1 * | 5/2010 | Devarapalli .................... | 709/245 |
| 2003/0081605 A1 * | 5/2003 | Egevang ........................ | 370/392 |
| 2006/0067217 A1 * | 3/2006 | Li et al. .......................... | 370/230 |
| 2008/0016550 A1 * | 1/2008 | McAlister ........................ | 726/1 |
| 2010/0218033 A1 * | 8/2010 | Safari et al. ........................ | 714/4 |

FOREIGN PATENT DOCUMENTS

JP 11-150566 6/1999

* cited by examiner

*Primary Examiner* — Dang Ton
*Assistant Examiner* — Robert M Morlan
(74) *Attorney, Agent, or Firm* — Antonelli, Terry, Stout & Kraus, LLP.

(57) ABSTRACT

An internetwork device comprises a receiving module, an inter-device packet transfer interface, an inter-device packet transfer controller, an address translation module, and a transmission module. The receiving module receives a packet from a first network. The inter-device packet transfer interface carries out inter-device packet transfer involving transfer of a packet to or from another internetwork device. The inter-device packet transfer controller controls the inter-device packet transfers such that multiple fragmented packets created from a same original packet are collected by the same internetwork device, the fragmented packets being packets created by dividing a single original packet into multiple parts. The address translation module translates between a local address used within a specific network and a global address used across multiple networks, for at least one of a source address and a destination address of a packet. The transmission module transmits an address-translated packet to a second network.

9 Claims, 13 Drawing Sheets

INTERNETWORK DEVICE

CROSS REFERENCE TO RELATED APPLICATIONS

The present application claims the priority based on a Japanese Patent Applications No. 2009-144073 filed on Jun. 17, 2009, and No. 2009-219903 filed on Sep. 25, 2009, the disclosures of which are hereby incorporated by reference in its entirety.

BACKGROUND

1. Technical Field

The present invention relates to an internetwork device adapted to translate between local addresses used within a specific network and global addresses used across several networks.

2. Description of Related Art

Communications between a local network that use local addresses, and a global network that connect several networks and uses global addresses (herein termed "the internet" by way of example) take place through address translation between local addresses and global addresses, carried out in a router located at the boundary of the local network and the internet. Such address translation is known as Network Address Translation. Also, in order to effectively utilize a limited number of global addresses, a translation scheme that also utilizes TCP/UDP communication port numbers in addition to local addresses and global addresses (known as Network Address and Port Translation) is commonly used as well. Herein, "Address Translation" (also called "NAT") is used to mean "Network Address and Port Translation". Such address translation is employed in routers intended to connect small scale networks in household or businesses to the internet.

More recently, for reasons such as a shortage of global addresses available with IPv4, even among Internet Service Providers (hereinafter also called "ISP") that serve large numbers of users there is an increasing need to accommodate users by allocating local addresses to internal network routers. In such instances, NAT functionality is required at the connection point of the ISP to the internet (the edge of the carrier network). NAT at this location differs significantly both in terms of role and required capabilities from NAT used to connect enterprise users and individual users to the ISP, and is called Large Scale NAT (LSN) or Carrier Grade NAT (CGN). Routers having LSN functionality are required to have so-called "carrier grade" performance and reliability. Routers having LSN functionality are also called "internetwork devices".

In most instances higher reliability is required of LSN than of conventional NAT. Accordingly, LSN is sometimes implemented through a configuration in which two redundant internetwork devices operate simultaneously (called "Double ACT configuration"). Where LSN is implemented by internetwork devices in Double ACT configuration, the problem arises that fragmented packets, which are packets created by dividing a single packet (original packet) into multiple parts, may not be processed correctly. Specifically, if network load dispersion is carried out at random by a communication device upstream from the internetwork devices, it is possible that a set of fragmented packets created from a given original packet (hereafter called a "same-source fragmented packet group") may not be collected by the same internetwork device. If a same-source fragmented packet group is not collected by the same internetwork device, it becomes difficult for the internetwork device to carry out identical address translation on each fragmented packet contained in the same-source fragmented packet group. Thus, the terminal that is the recipient of the fragmented packets may not recognize that the received fragmented packets belong to a same-source fragmented packet group, and may not be able to correctly reassemble the original packet. Also, depending on the load on each internetwork device, differences may arise in terms of latency from input to output of fragmented packets, leading to the possibility that fragmented packets are not forwarded in the correct sequence number to a device downstream from the internetwork devices.

Such problems are not limited to configurations with two internetwork devices, but are common to instances in which address translation is carried out in a configuration with multiple internetwork devices operating simultaneously.

SUMMARY

An object of the present invention is to provide technology whereby fragmented packets may be processed correctly in instances where address translation is carried out in a configuration with multiple internetwork devices operating simultaneously.

In one aspect of the present invention, there is provided an internetwork device. The internetwork device comprises a receiving module, an inter-device packet transfer interface, an inter-device packet transfer controller, an address translation module, and a transmission module. The receiving module receives a packet from a first network. The inter-device packet transfer interface carries out inter-device packet transfer involving transfer of a packet to or from another internetwork device. The inter-device packet transfer controller controls the inter-device packet transfers such that multiple fragmented packets created from a same original packet are collected by the same internetwork device, the fragmented packets being packets created by dividing a single original packet into multiple parts. The address translation module translates between a local address used within a specific network and a global address used across multiple networks, for at least one of a source address and a destination address of a packet. The transmission module transmits an address-translated packet to a second network.

According to this internetwork device, received packets are forwarded to and from the other internetwork device in such a way that multiple fragmented packets created from the same original packet are collected by the same internetwork device, thereby making it possible for the fragmented packets to be processed correctly in instances where address translation is carried out in a configuration with multiple internetwork devices operating simultaneously.

The present invention can be realized in various aspects. For example, the present invention can be realized in aspects such as an internetwork device, method of address translation, a network system having multiple internetwork devices, an integrated circuit or a computer program that execute the functions of these devices, methods and systems, a recording medium on which such computer program is recorded, or a computer program product that includes this recording medium.

These and other objects, features, aspects, and advantages of the present invention will become more apparent from the following detailed description of the preferred embodiments with the accompanying drawings.

DESCRIPTION OF THE PREFERRED EMBODIMENT

The embodiments of the present invention are described below in the following order.
A. Embodiment 1
 A-1. System and Device Configuration
 A-2. Outbound Packet Forwarding Process
 A-3. Inter-device Transfer Outbound Packet Forwarding Process
 A-4. Inbound Packet Forwarding Process
 A-5. Inter-device Transfer Inbound Packet Forwarding Process
C. Embodiment 2
 C-1. Internetwork Device Startup Process (Prevention of Discarding of Inter-device Packets)
 C-2. Internetwork Device Startup Process (Prevention of Discarding of Packets from Network by Bringing Down the Link)
 C-3. Internetwork Device Startup Process (Prevention of Discarding of Packets from Network by Route Propagation)
B. Modified Embodiments A. Embodiment 1

A-1. System and Device Configuration

Figure 1:
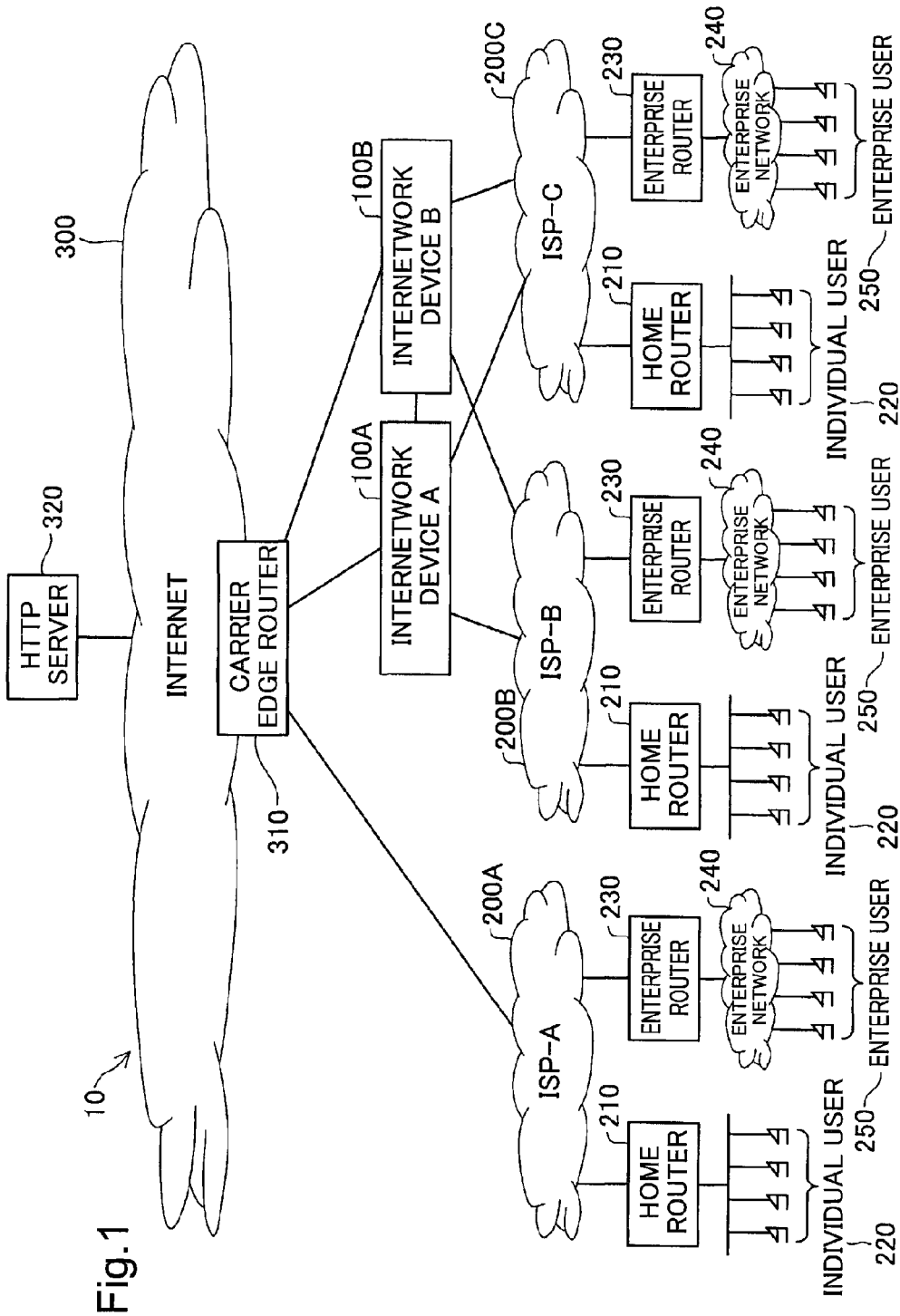
FIG. 1 is an illustration schematically depicting the configuration of a network 10 according to an Embodiment 1 of the present invention.

FIG. 1 is an illustration schematically depicting the configuration of a network 10 according to an Embodiment 1 of the present invention. The network 10 includes three ISPs (Internet Service Providers) 200. Each ISP 200 accommodates a number of individual users 220 via a home router 210 having NAT functionality, as well as a number of enterprise users 250 via an enterprise network (enterprise internal networks) 240 and an enterprise router 230 having NAT functionality.

ISP-A (200A) is an ISP having a global address, and is able to communicate with the internet 300 through a direct connection with a carrier edge router 310. An HTTP server 320 is provided on the internet 300, at a location accessible by individual user 220 and enterprise user 250 clients.

ISP-B (200B) and ISP-C (200C) are ISPs that lack a global address, and are able to communicate with the internet 300 by connecting to the carrier edge router 310 via internetwork devices 100 with LSN (Large Scale NAT) functionality. The present embodiment employs a redundant configuration in which two internetwork devices 100 (internetwork device A (100A) and internetwork device B (100B)) having identical functionality and configuration operate simultaneously (Double ACT configuration). Specifically, ISP-B (200B) and ISP-C (200C) are each connected to the two internetwork devices 100 and are able thereby to connect to the carrier edge router 310 through either internetwork device 100. The two internetwork devices 100 synchronize with one another information needed for address translation (session information). ISP-B (200B) and ISP-C (200C) respectively have routers (not shown) connected to the two internetwork devices 100. These routers direct packets in communications bound from the ISP 200 (local network) to the internet 300 (hereinafter termed "outbound communications") to either of the two internetwork devices 100. Similarly, the carrier edge router 310 directs packets in communications bound from the internet 300 to the ISP 200 (hereinafter termed "inbound communications") to either of the two internetwork devices 100. Load dispersion between the two internetwork devices 100 is accomplished thereby. If either of the two internetwork devices 100 encounters a problem, it is possible for address translation to continue by directing all packets to the other internetwork device 100. The functions of the internetwork devices 100 may be viewed as part of the functionality of the carrier edge router 310.

Figure 2:
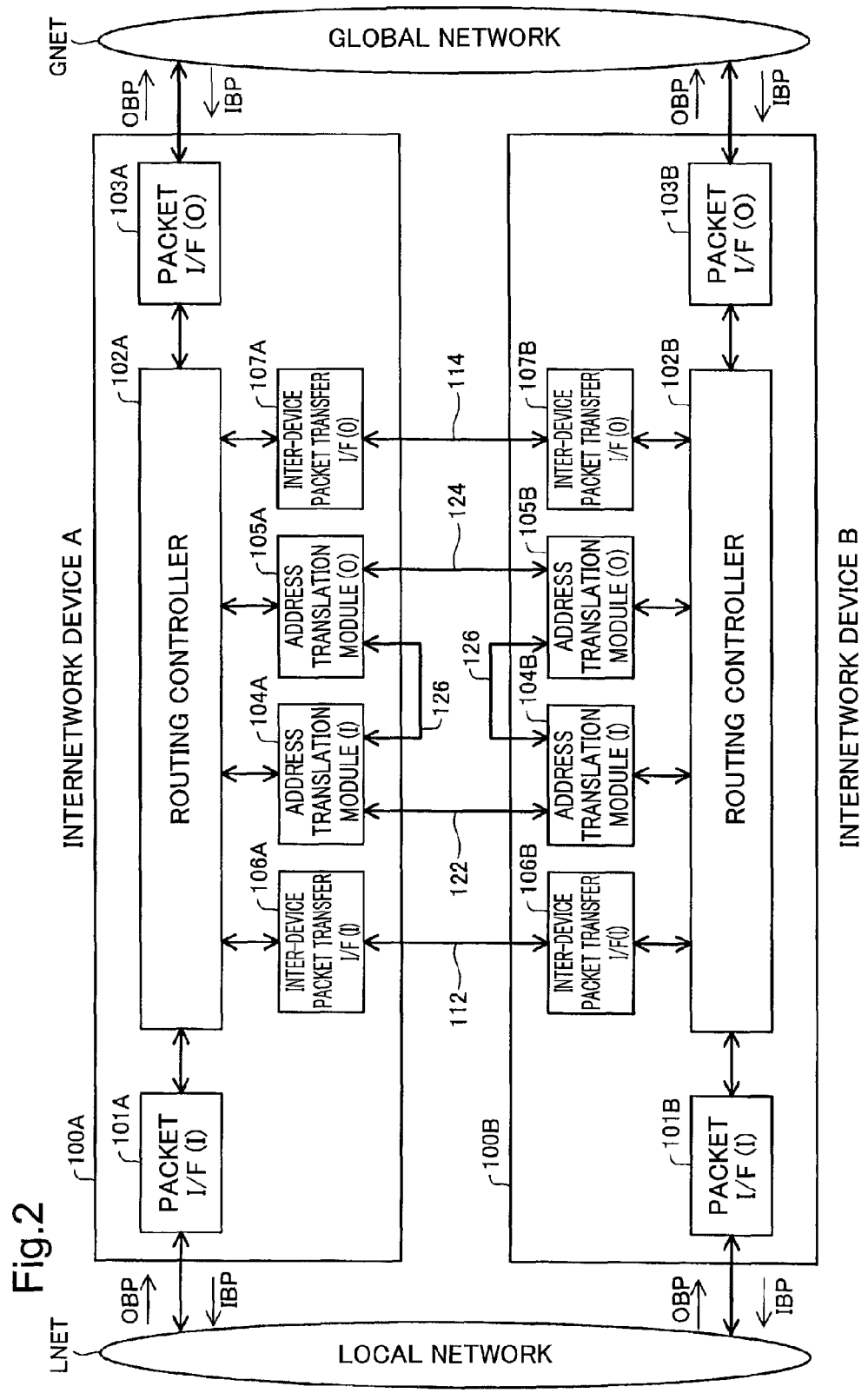
FIG. 2 is an illustration schematically depicting the configuration of internetwork devices 100.

FIG. 2 is an illustration schematically depicting the configuration of internetwork devices 100. The configurations of two internetwork devices 100 (internetwork device A (100A) and internetwork device B (100B)) are shown in FIG. 2. Because the two internetwork devices have identical configurations, in the following description, the identifiers for distinguishing between devices (i.e. "A" and "B") are not appended to names or drawing symbols except where necessary to do so to distinguish the two internetwork devices 100 and their constituent elements from one another.

The internetwork devices 100 are devices for performing address translation (address and port translation) so that communication can take place between a local network LNET and a global network GNET. Each internetwork device 100 includes an inside packet interface (packet I/F (I)) 101 for connecting to the local network LNET; an outside packet interface (packet I/F (O)) 103 for connecting to the global network GNET; a routing controller 102 for controlling packet routing; an inside address translation module (address translation module (I)) 104 for performing address translation of outbound communication packets (hereinafter termed "outbound packets OBP"); an outside address translation module (address translation module (O)) 105 for performing address translation of inbound communication packets (hereinafter termed "inbound packets IBP"); an inside inter-device packet transfer interface (inter-device packet forwarding I/F (I)) 106 for forwarding outbound packets OBP to the other internetwork device 100; and an outside inter-device packet transfer interface (inter-device packet forwarding I/F (O)) 107 for forwarding inbound packets IBP to the other internetwork device 100.

The inside packet interface 101 is connected to the routing controller 102, and to a router (not shown) located on the local network LNET and that carries out load dispersion. The inside packet interface 101 receives outbound packets OBP sent from the router and forwards these to the routing controller 102, and also receives inbound packets IBP forwarded from the routing controller 102 and forwards these to the router. The outside packet interface 103 is connected to the routing controller 102 and to the carrier edge router 310 (FIG. 1). The outside packet interface 103 receives inbound packets IBP sent from the carrier edge router 310 and forwards these to the routing controller 102, and also receives outbound packets OBP forwarded from the routing controller 102 and forwards these to the carrier edge router 310. The inside packet interface 101 and the outside packet interface 103 function as the transmission module and the receiving module in the present invention.

The routing controller 102 is connected to constituent elements of the internetwork device 100. The routing controller 102 carries out forwarding of packets received from the various interfaces, as well as a process to determine whether received packets are fragmented packets. The packet forwarding process of the routing controller 102 will be discussed in detail later.

The inside redundant inter-device packet transfer interface 106 is an interface adapted for direct connection to another internetwork device 100. Specifically, for operation in Double ACT configuration, the inside redundant inter-device packet transfer interface 106 is connected via a dedicated line 112 to the inside redundant inter-device packet transfer interface 106 of the other internetwork device 100. The inside redundant inter-device packet transfer interface 106 is adapted to receive outbound packets OBP forwarded from the routing controller 102 in its home device and to transmit these to the inside redundant inter-device packet transfer interface 106 of the other internetwork device 100; as well as to receive outbound packets OBP forwarded from the other internetwork device 100 (termed "inter-device transfer outbound packets TOBP") and to forward these to the routing controller 102 in its home device. In the present embodiment, the communication band (line speed) of the inside redundant inter-device packet transfer interface 106 is the same as the communication band (line speed) of the inside packet interface 101, so as to be able to handle instances in which all outbound packets OBP received by the inside packet interface 101 are forwarded to the other internetwork device 100 as inter-device transfer outbound packets TOBP.

The outside redundant inter-device packet transfer interface 107 is an interface adapted for direct connection to another internetwork device 100. Specifically, for operation in Double ACT configuration, the outside redundant inter-device packet transfer interface 107 is connected via a dedicated line 114 to the outside redundant inter-device packet transfer interface 107 of the other internetwork device 100. The outside redundant inter-device packet transfer interface 107 is adapted to receive inbound packets IBP forwarded from the routing controller 102 in its home device and to transmit these to the outside redundant inter-device packet transfer interface 107 of the other internetwork device 100; as well as to receive inbound packets IBP forwarded from the other internetwork device 100 (termed "inter-device transferred inbound packets TIBP") and to forward these to the routing controller 102 in its home device. In the present embodiment, the communication band (line speed) of the outside redundant inter-device packet transfer interface 107 is the same as the communication band (line speed) of the outside packet interface 103, so as to be able to handle instances in which all inbound packets IBP received by the outside packet interface 103 are forwarded to the other internetwork device 100 as inter-device transferred inbound packets TIBP.

The inside redundant inter-device packet transfer interface 106 and the outside redundant inter-device packet transfer interface 107 function as the inter-device packet forwarding interfaces in the present invention. The routing controller 102 functions as the inter-device packet forwarding controller in the present invention.

The inside address translation module 104 is adapted to maintain address and port translation information (session information); and on the basis of the address and port translation information, to carry out translation of the source address (sending address) and communication port number (address translation) of outbound packets OBP forwarded from the routing controller 102, then re-forward the address-translated outbound packets OBP back to the routing controller 102.

The outside address translation module 105 is adapted to maintain address and port translation information (session information); and on the basis of the address and port translation information, to carry out translation of the destination address and communication port number (address translation) of inbound packets IBP forwarded from the routing controller 102, then re-forward the address-translated inbound packets IBP back to the routing controller 102.

The inside address translation module 104 and the outside address translation module 105 are connected to one another via a line 126, and are also connected to the inside address translation module 104 and the outside address translation module 105 of the other internetwork device 100 via lines 122 and 124. The inside address translation modules 104 and the outside address translation modules 105 of the internetwork devices 100 carry out synchronization of address and port translation information via these lines. Address and port translation information includes an address translation rule table indicating mappings between local addresses and global addresses; a free port management table indicating In Use/Not In Use status of communication ports in global addresses; and an address/port translation table indicating corresponding relations between address/communication port combinations on the local network side and address/communication port combinations on the global network side. The inside address translation module 104 and the outside address translation module 105 function as the address translation modules in the present invention.

A-2. Outbound Packet Forwarding Process

Figure 3:
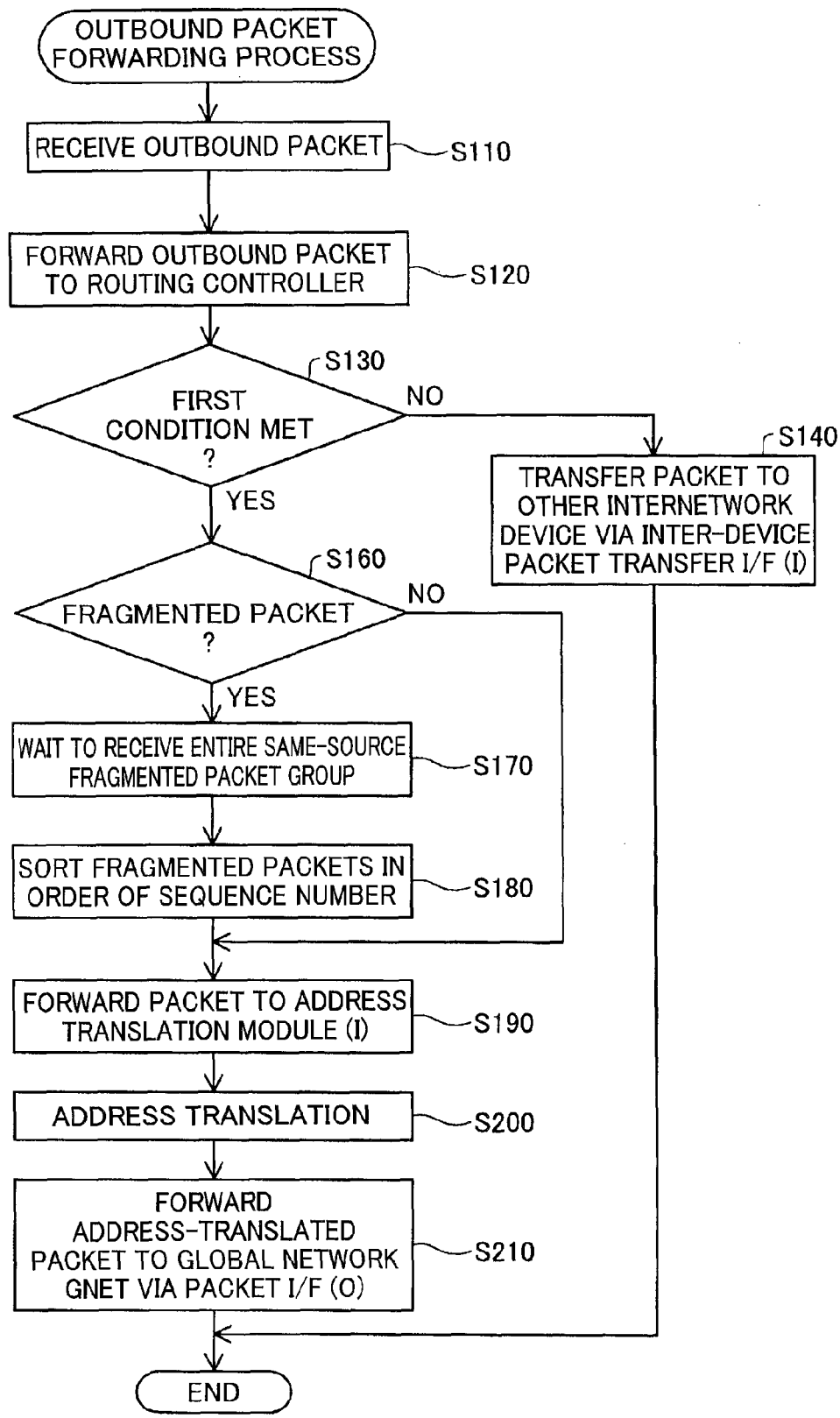
FIG. 3 is a flowchart depicting the flow of the outbound packet forwarding process.
Figure 4:
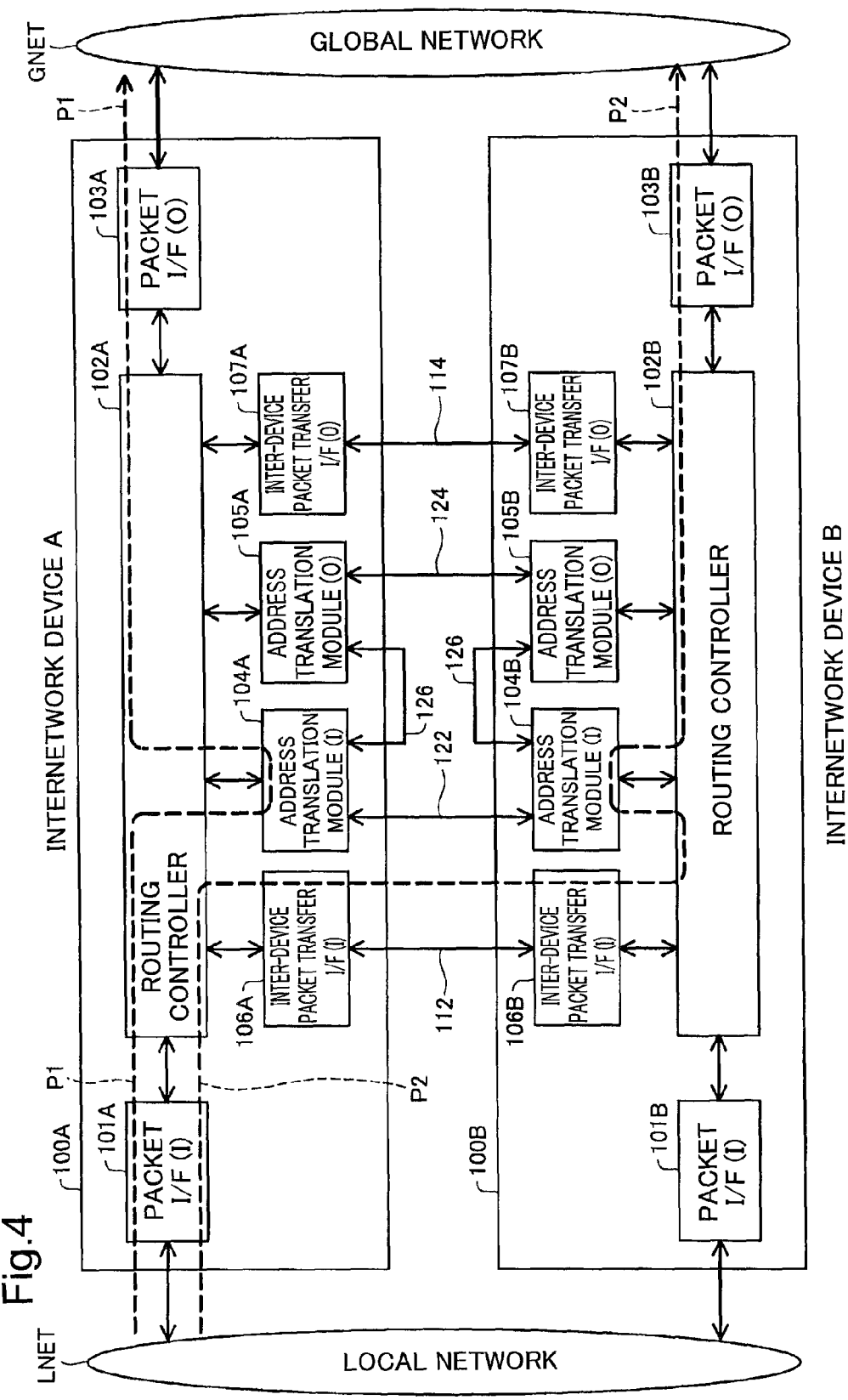
FIG. 4 is an illustration of packet forwarding routes in the outbound packet forwarding process.

FIG. 3 is a flowchart depicting the flow of the outbound packet forwarding process. FIG. 4 is an illustration of packet forwarding routes in the outbound packet forwarding process. The outbound packet forwarding process is a process whereby an internetwork device 100 that has received outbound packets OBP from the local network LNET forwards the received packets to the global network GNET. The following description assumes that the two internetwork devices 100 are operating simultaneously in Double ACT redundant configuration, and describes the outbound packet forwarding process that takes place when outbound packets OBP sent from the local network LNET are received by the internetwork device 100A (see FIG. 4).

In Step S110 (FIG. 3), the inside packet interface 101 of the internetwork device 100 (100A) receives outbound packets OBP from the local network LNET. The inside packet interface 101 then forwards the received outbound packets OBP to the routing controller 102 (Step S120).

In Step S130 (FIG. 3), the routing controller 102 determines whether the received outbound packets OBP meet either a first condition or a second condition. Here, the first condition and the second condition are set up so that any outbound packet OBP meets either the first condition or the second condition. Also, the first condition and the second condition are set up so that all fragmented packets contained in a same-source fragmented packet group meet the same condition. Herein, a same-source fragmented packet group means a set of multiple fragmented packets created from the same original packet. The first condition and the second condition in one internetwork device 100 are set up to be the opposite of the first condition and the second condition in the other internetwork device 100. In the present embodiment, in the internetwork device 100A, the first condition is that "the source address is an even number" and the second condition is that "the source address is not an even number (is an odd number)". In the internetwork device 100B on the other hand, in order to make the relationship of the first condition and the second condition the reverse of their relationship in the internetwork device 100A, the first condition is that "the source address is not an even number (is an odd number)" and the second condition is that "the source address is an even number". Where the first and second conditions are set up in this way, any outbound packet OBP meets either the first condition or the second condition. Also, because fragmented packets contained in a given same-source fragmented packet group share the same source address, they all meet the same condition.

In Step S130 (FIG. 3), the routing controller 102 of the internetwork device 100A determines whether the outbound packet OBP source address is an even number (i.e. whether it meets the first condition) or an odd number (i.e. whether it meets the second condition). If it is determined that the outbound packet OBP meets the second condition and not the first condition (Step S130: NO), the routing controller 102 forwards the outbound packet OBP to the other internetwork device 100 (100B) via the inside redundant inter-device packet transfer interface 106 (Step S140) (see path P2 in FIG. 4). The process that takes place when an internetwork device 100 receives an outbound packet OBP transferred from the other internetwork device 100 (inter-device transfer outbound packet TOBP) will be discussed later.

If on the other hand it is determined that the outbound packet OBP meets the first condition (Step S130: YES), the routing controller 102 then determines whether the outbound packet OBP is a fragmented packet (Step S160). If determined that the outbound packet OBP is not a fragmented packet (Step S160: NO), the routing controller 102 forwards the outbound packet OBP to the inside address translation module 104 (Step S190) (see path P1 in FIG. 4). The inside address translation module 104 having received the outbound packet OBP references the address/port translation information and carries out address translation (translation of the source address and communication port number) (Step S200).

If on the other hand it is determined that the outbound packet OBP is a fragmented packet, (Step S160: YES), the routing controller 102 waits to receive all of the packets that make up the same-source fragmented packet group to which the received fragmented packet belongs (Step S170). Through monitoring of packets forwarded from the local network LNET via the inside packet interface 101 and of packets transferred from the other internetwork device 100 via the inside redundant inter-device packet transfer interface 106, the routing controller 102 determines whether all of the packets that make up the same-source fragmented packet group have been received.

Once all of the packets that make up the same-source fragmented packet group are received, the routing controller 102 sorts all the received fragmented packets in order of sequence number (Step S180). The routing controller 102 then forwards the fragmented packets (outbound packets OBP) in order of sequence number to the inside address translation module 104 (Step S190) (see path P1 in FIG. 4). Once the inside address translation module 104 has received the outbound packets OBP, it references the address/port translation information and carries out address translation (translation of the source address and communication port number) (Step S200).

The inside address translation module 104 forwards the address-translated outbound packets OBP to the routing controller 102, whereupon the routing controller 102 carries out routing according to the destination address, and forwards the outbound packets OBP to the global network GNET via the outside packet interface 103 (Step S210) (see path P1 in FIG. 4).

The outbound packet forwarding process when outbound packets OBP are received by the internetwork device 100B takes place in the same manner as above. In this case, in Step S130 (FIG. 3) it is determined whether the outbound packet OBP source address is an odd number (i.e. meets condition 1) or an even number (i.e. meets condition 2), and according to the outcome of the decision either a process to forward the outbound packet OBP to the other internetwork device 100 (Step S140), or to process it internally (Steps S160-210) is carried out.

A-3. Inter-Device Transfer Outbound Packet Forwarding Process

Figure 5:
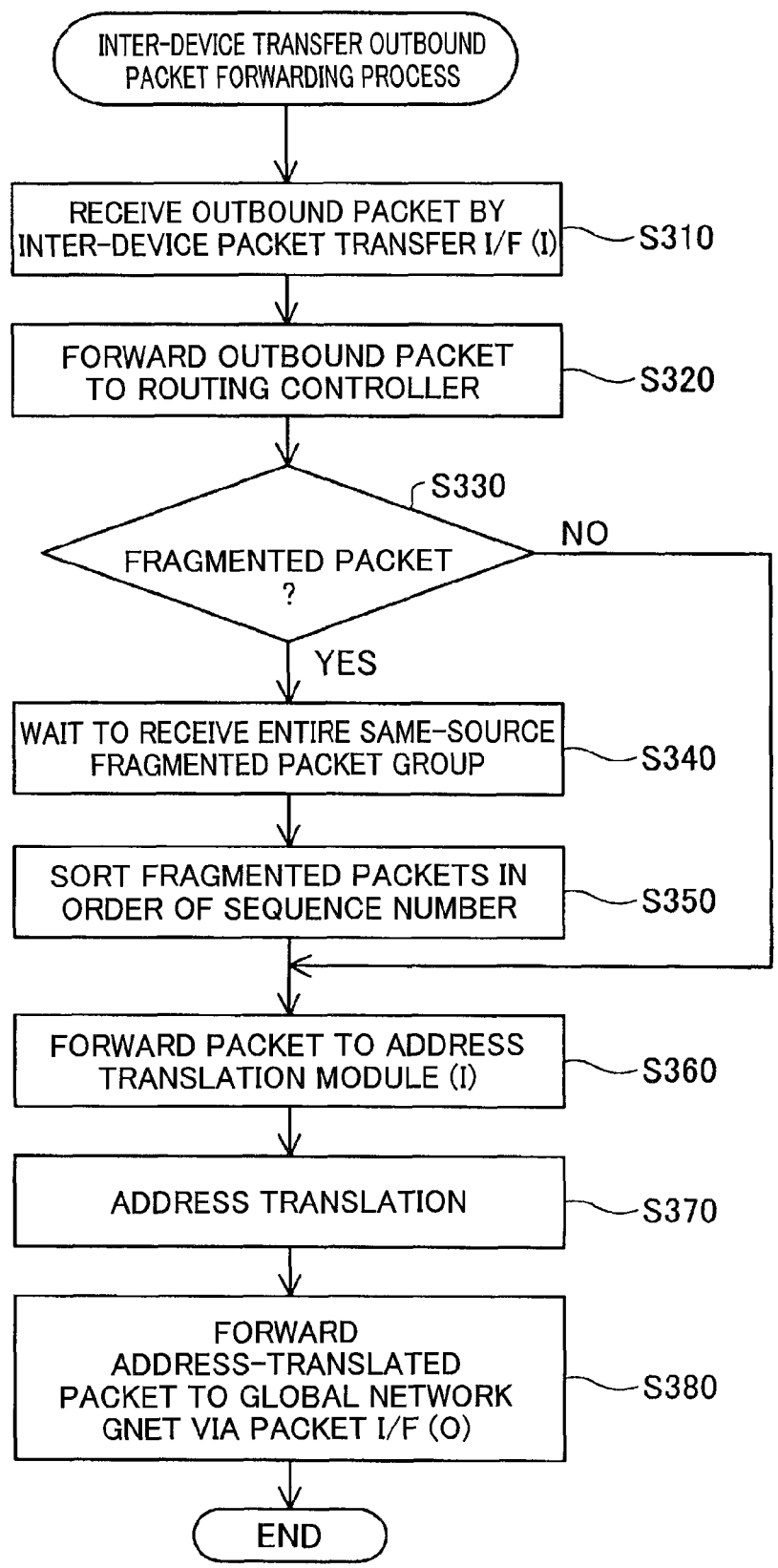
FIG. 5 is a flowchart depicting the flow of the inter-device transfer outbound packet forwarding process.

FIG. 5 is a flowchart depicting the flow of the inter-device transfer outbound packet forwarding process. The inter-device transfer outbound packet forwarding process is a process by which an internetwork device 100 having received outbound packets OBP (inter-device transfer outbound packets TOBP) from the other internetwork device 100 forwards the received packets to the global network GNET. The following description assumes that the two internetwork devices 100 are operating simultaneously in Double ACT redundant configuration, and describes the inter-device transfer outbound packet forwarding process that takes place when inter-device transfer outbound packets TOBP transferred from the internetwork device 100A are received by the internetwork device 100B (see path P2 in FIG. 4). The specifics of the inter-device transfer outbound packet forwarding process that takes place when inter-device transfer outbound packets TOBP transferred from the internetwork device 100B are received by the internetwork device 100A would be the same.

In Step S310 (FIG. 5), the inside redundant inter-device packet transfer interface 106 of the internetwork device 100 (100B) receives an outbound packet OBP (inter-device transfer outbound packet TOBP) from the other internetwork device 100 (100A). The inside redundant inter-device packet transfer interface 106 forwards the received outbound packet OBP to the routing controller 102 (Step S320).

In Step S330 (FIG. 5), the routing controller 102 determines whether the outbound packet OBP is a fragmented packet (Step S330). If determined that the outbound packet OBP is not a fragmented packet (Step S330: NO), the routing controller 102 forwards the outbound packet OBP to the inside address translation module 104 (Step S360) (see path P2 in FIG. 4). The inside address translation module 104 having received the outbound packet OBP references the address/port translation information and carries out address translation (translation of the source address and communication port number) (Step S370).

If on the other hand it is determined that the outbound packet OBP is a fragmented packet, (Step S330: YES), the routing controller 102 waits to receive all of the packets that make up the same-source fragmented packet group to which the received fragmented packet belongs (Step S340). Through monitoring of packets forwarded from the local network LNET via the inside packet interface 101 and of packets transferred from the other internetwork device 100 via the inside redundant inter-device packet transfer interface 106, the routing controller 102 determines whether all of the packets that make up the same-source fragmented packet group have been received.

Once all of the packets that make up the same-source fragmented packet group are received, the routing controller 102 sorts all the received fragmented packets in order of sequence number (Step S350). The routing controller 102 then forwards the fragmented packets (outbound packets OBP) in order of sequence number to the inside address translation module 104 (Step S360). Once the inside address translation module 104 has received the outbound packets OBP, it references the address/port translation information and carries out address translation (translation of the source address and communication port number) (Step S370).

The inside address translation module 104 forwards the address-translated outbound packets OBP to the routing controller 102, whereupon the routing controller 102 carries out routing according to the destination address, and forwards the outbound packets OBP to the global network GNET via the outside packet interface 103 (Step S380) (see path P2 in FIG. 4).

A-4. Inbound Packet Forwarding Process

Figure 6:
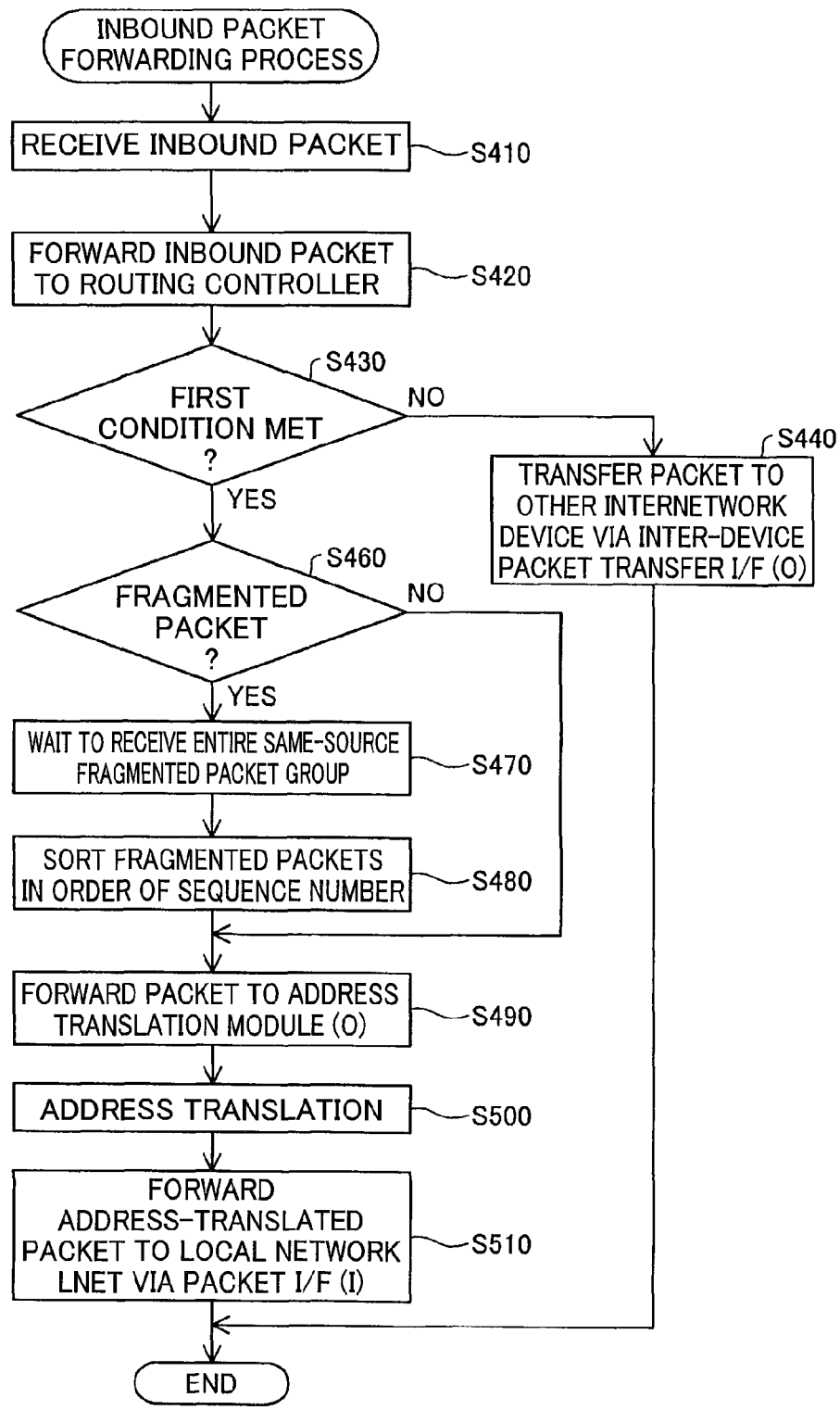
FIG. 6 is a flowchart depicting the flow of the inbound packet forwarding process.
Figure 7:
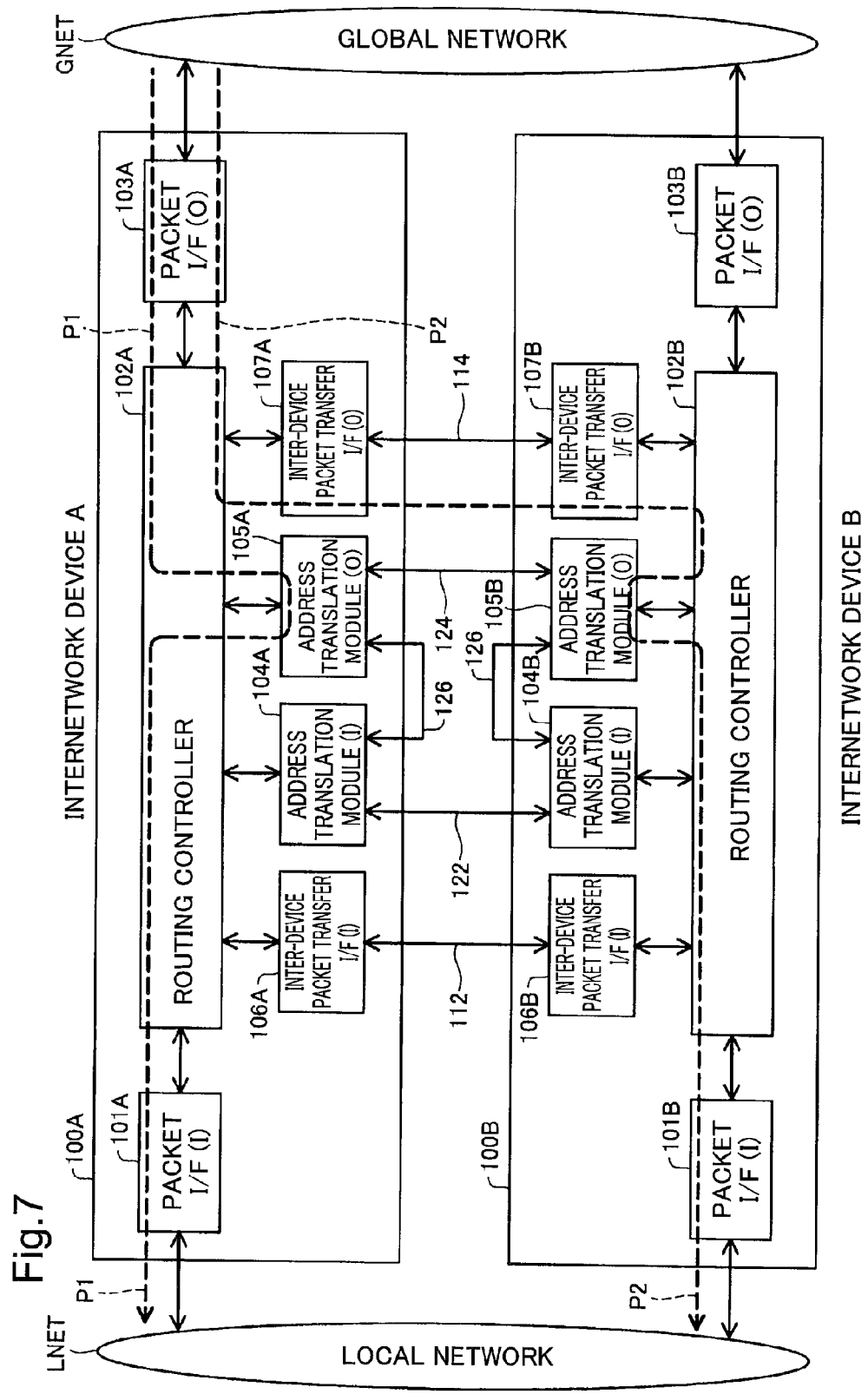
FIG. 7 is an illustration of packet forwarding routes in the inbound packet forwarding process.

FIG. 6 is a flowchart depicting the flow of the inbound packet forwarding process. FIG. 7 is an illustration of packet forwarding routes in the inbound packet forwarding process. The inbound packet forwarding process is a process whereby an internetwork device 100 that has received inbound packets IBP from the global network GNET forwards the received packets to the local network LNET. The following description assumes that the two internetwork devices 100 are operating simultaneously in Double ACT redundant configuration, and describes the inbound packet forwarding process that takes place when inbound packets IBP sent from the global network GNET are received by the internetwork device 100A (see FIG. 7).

In Step S410 (FIG. 6), the outside packet interface 103 of the internetwork device 100 (100A) receives inbound packets IBP from the global network GNET. The outside packet interface 103 then forwards the received inbound packets IBP to the routing controller 102 (Step S420).

In Step S430 (FIG. 6), the routing controller 102 determines whether the received inbound packets IBP meet either a first condition or a second condition. Here, the first condition and the second condition are set up so that any inbound packet IBP meets either the first condition or the second condition. Also, the first condition and the second condition are set up so that all fragmented packets contained in a same-source fragmented packet group meet the same condition.

The first condition and the second condition in one internetwork device 100 are set up to be the opposite of the first condition and the second condition in the other internetwork device 100. In the present embodiment, in the internetwork device 100A, the first condition is that "the source address is an even number" and the second condition is that "the source address is not an even number (is an odd number)". In the internetwork device 100B on the other hand, in order to make the relationship of the first condition and the second condition the reverse of their relationship in the internetwork device 100A, the first condition is that "the source address is not an even number (is an odd number)" and the second condition is that "the source address is an even number". Where the first and second conditions are set up in this way, any inbound packet IBP meets either the first condition or the second condition. Also, because fragmented packets contained in a given same-source fragmented packet group share the same source address, they all meet the same condition.

In Step S430 (FIG. 6), the routing controller 102 of the internetwork device 100A determines whether the inbound packet IBP source address is an even number (i.e. whether it meets the first condition) or an odd number (i.e. whether it meets the second condition). If it is determined that the inbound packet IBP meets the second condition and not the first condition (Step S430: NO), the routing controller 102 forwards the inbound packet IBP to the other internetwork device 100 (100B) via the outside redundant inter-device packet transfer interface 107 (Step S440) (see path P2 in FIG. 7). The process that takes place when an internetwork device 100 receives an inbound packet IBP transferred from the other internetwork device 100 (inter-device transfer inbound packet TIBP) will be discussed later.

If on the other hand it is determined that the inbound packet IBP meets the first condition (Step S430: YES), the routing controller 102 then determines whether the inbound packet IBP is a fragmented packet (Step S460). If determined that the inbound packet IBP is not a fragmented packet (Step S460: NO), the routing controller 102 forwards the inbound packet IBP to the outside address translation module 105 (Step S490) (see path P1 in FIG. 7). The outside address translation module 105 having received the inbound packet IBP references the address/port translation information and carries out address translation (translation of the destination address and communication port number) (Step S500).

If on the other hand it is determined that the inbound packet IBP is a fragmented packet, (Step S460: YES), the routing controller 102 waits to receive all of the packets that make up the same-source fragmented packet group to which the received fragmented packet belongs (Step S470). Through monitoring of packets forwarded from the global network GNET via the outside packet interface 103 and of packets transferred from the other internetwork device 100 via the outside redundant inter-device packet transfer interface 107, the routing controller 102 determines whether all of the packets that make up the same-source fragmented packet group have been received.

Once all of the packets that make up the same-source fragmented packet group are received, the routing controller 102 sorts all the received fragmented packets in order of sequence number (Step S480). The routing controller 102 then forwards the fragmented packets (inbound packets IBP) in order of sequence number to the outside address translation module 105 (Step S490) (see path P1 in FIG. 7). Once the outside address translation module 105 has received the inbound packets IBP, it references the address/port translation information and carries out address translation (translation of the destination address and communication port number) (Step S500).

The outside address translation module 105 forwards the address-translated inbound packets IBP to the routing controller 102, whereupon the routing controller 102 carries out routing according to the destination address, and forwards the inbound packets IBP to the local network LNET via the inside packet interface 101 (Step S510) (see path P1 in FIG. 7).

The inbound packet forwarding process when inbound packets IBP are received by the internetwork device 100B takes place in the same manner as above. In this case, in Step S430 (FIG. 6) it is determined whether the inbound packet IBP source address is an odd number (i.e. meets condition 1) or an even number (i.e. meets condition 2), and according to the outcome of the decision either a process to forward the inbound packet IBP to the other internetwork device 100 (Step S440), or to process it internally (Steps S460-510) is carried out.

A-5. Inter-Device Transfer Inbound Packet Forwarding Process

Figure 8:
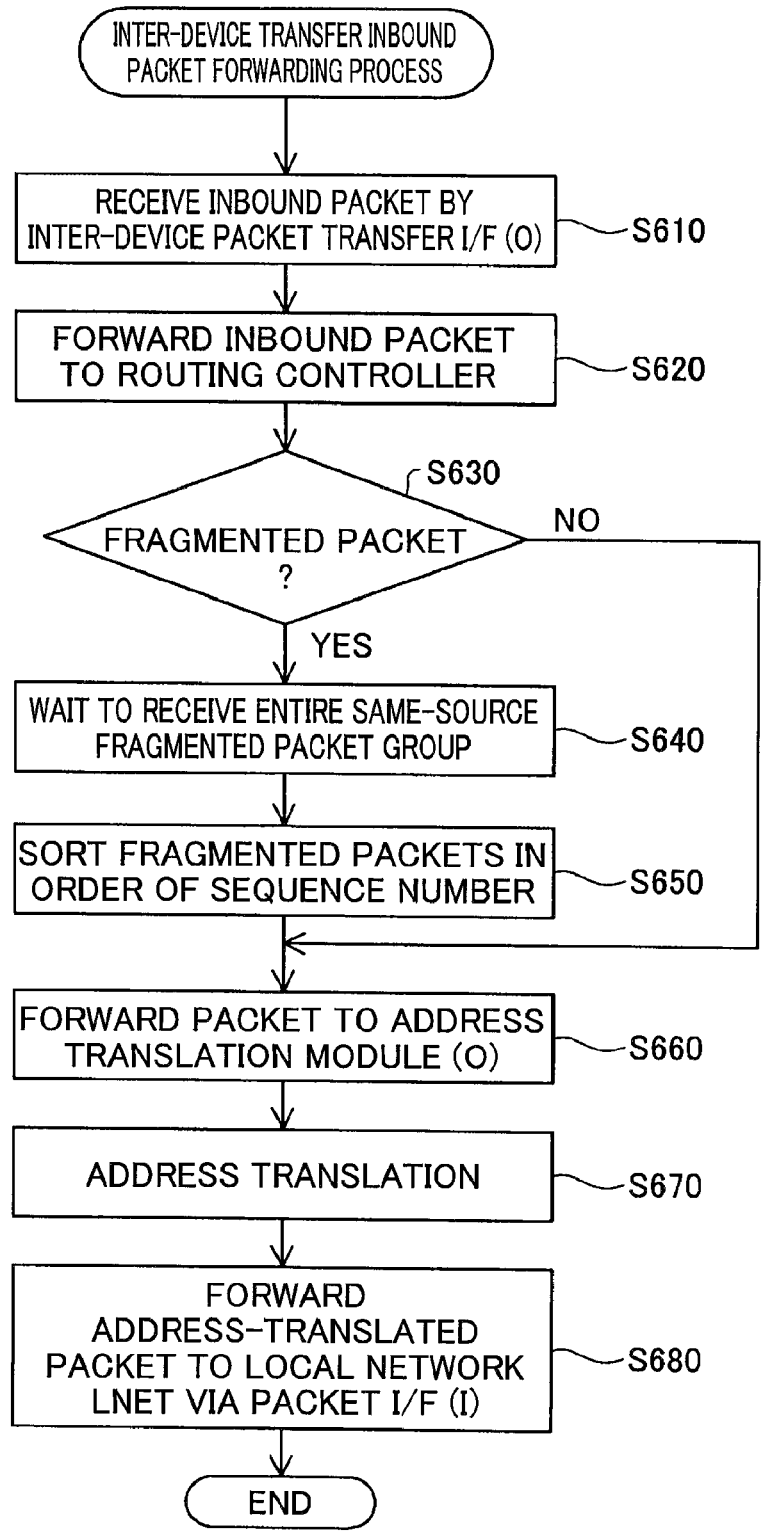
FIG. 8 is a flowchart depicting the flow of the inter-device transfer inbound packet forwarding process.

FIG. 8 is a flowchart depicting the flow of the inter-device transfer inbound packet forwarding process. The inter-device transfer inbound packet forwarding process is a process by which an internetwork device 100 having received inbound packets IBP (inter-device transfer inbound packets TIBP) from the other internetwork device 100 forwards the received packets to the local network LNET. The following description assumes that the two internetwork devices 100 are operating simultaneously in Double ACT redundant configuration, and describes the inter-device transfer inbound packet forwarding process that takes place when inter-device transfer inbound packets TIBP transferred from the internetwork device 100A are received by the internetwork device 100B (see path P2 in FIG. 7). The specifics of the inter-device transfer inbound packet forwarding process that takes place when inter-device transfer inbound packets TIBP transferred from the internetwork device 100B are received by the internetwork device 100A would be the same.

In Step S610 (FIG. 8), the outside redundant inter-device packet transfer interface 107 of the internetwork device 100 (100B) receives an inbound packet IBP (inter-device transfer inbound packet TIBP) from the other internetwork device 100 (100A). The outside redundant inter-device packet transfer interface 107 forwards the received inbound packet IBP to the routing controller 102 (Step S620).

In Step S630 (FIG. 8), the routing controller 102 determines whether the inbound packet IBP is a fragmented packet (Step S630). If determined that the inbound packet IBP is not a fragmented packet (Step S630: NO), the routing controller 102 forwards the inbound packet IBP to the outside address translation module 105 (Step S660) (see path P2 in FIG. 7). The outside address translation module 105 having received the inbound packet IBP references the address/port translation information and carries out address translation (translation of the destination address and communication port number) (Step S670).

If on the other hand it is determined that the inbound packet IBP is a fragmented packet, (Step S630: YES), the routing controller 102 waits to receive all of the packets that make up the same-source fragmented packet group to which the received fragmented packet belongs (Step S640). Through monitoring of packets forwarded from the global network GNET via the outside packet interface 103 and of packets transferred from the other internetwork device 100 via the outside redundant inter-device packet transfer interface 107, the routing controller 102 determines whether all of the packets that make up the same-source fragmented packet group have been received.

Once all of the packets that make up the same-source fragmented packet group are received, the routing controller 102 sorts all the received fragmented packets in order of sequence number (Step S650). The routing controller 102 then forwards the fragmented packets (inbound packets IBP) in order of sequence number to the outside address translation module 105 (Step S660). Once the outside address translation module 105 has received the inbound packets IBP, it references the address/port translation information and carries out address translation (translation of the destination address and communication port number) (Step S670).

The outside address translation module 105 forwards the address-translated inbound packets IBP to the routing controller 102, whereupon the routing controller 102 carries out routing according to the destination address, and forwards the inbound packets IBP to the local network LNET via the inside packet interface 101 (Step S680) (see path P2 in FIG. 7).

As described above, according to the present embodiment, when an internetwork device 100 receives packets from either the local network LNET or the global network GNET, after first determining whether the packets meet either the first condition or the second condition (Step S130 in FIG. 3 and Step S430 in FIG. 6), the received packets are directed to either the home internetwork device 100 or the other internetwork device 100. Here, because the first condition and the second condition are set up such that all fragmented packets included in a same-source fragmented packet group meet the same condition, the entire same-source fragmented packet group is collected by the same internetwork device 100. Typically, the initial fragmented packet in a same-source fragmented packet group contains in its data portion information identifying the communication port number, whereas the second and subsequent fragmented packets do not contain information identifying the communication port number. In the present embodiment however, because the entire same-source fragmented packet group is collected by the same internetwork device 100, address translation inclusive of communication port number (address and port translation) can be accomplished on such fragmented packets as well. Thus, according to the present embodiment, fragmented packets contained in a same-source fragmented packet group can undergo identical address translation, and the terminal for which the fragmented packets are destined will be able to correctly reassemble the original packet on the basis of the received fragmented packets. Thus, where the present embodiment is employed for address translation in a configuration with multiple internetwork devices 100 operating simultaneously, address translation of fragmented packets can be carried out correctly.

Moreover, in the present embodiment, if a received packet is a fragmented packet, the device waits until all of the fragmented packets that make up the same-source fragmented packet group are received, and having received these then sorts all of the fragmented packets in order of sequence number, and forwards them in order of sequence number. Thus, according to the present embodiment, fragmented packets can be forwarded in order of sequence number to devices downstream from the internetwork devices 100.

According to the present embodiment, conditions that pertain to information originally included in packets, i.e. the source address, are employed as the first and second conditions, so same-source fragmented packet groups can be collected by the same internetwork device 100 without any need to append to the packets additional information for the purpose of packet collection.

C. Embodiment 2

In LSN, address and port translation information (session information) that indicates currently corresponding relations of address/communication port combinations on the local network side and address/communication port combinations on the global network side is determined either dynamically or statically in the respective internetwork devices 100 according to the IP address and port number of the original packet that was initially received. In configurations where packets are transferred among multiple internetwork devices 100 operating simultaneously and address translation frequently takes place in a different internetwork device, because it is necessary for the respective internetwork devices to carry out address translation based on the same session information regardless of which internetwork device receives the original packet, the multiple internetwork devices 100 must synchronize session information with one another in order to maintain the same session information. In the event that, for example, a stopped internetwork device 100 is restarted, another operational internetwork device 100 must transfer the session information it maintains to the internetwork device 100 that has started up, so that the two internetwork devices 100 can maintain the same session information.

Under these circumstances, if for example when a first internetwork device 100 is started up, packets are transferred between the two internetwork devices 100 prior to synchronization of session information between the devices, address translation cannot take place because the first internetwork device 100 lacks session information, so the packets are discarded.

The present embodiment describes an embodiment of the present invention whereby in a configuration in which address translation is carried out on packets transferred between multiple internetwork devices 100 operating simultaneously, if an internetwork device 100 is started up, discarding of packets by the started up internetwork device 100 is prevented so that correct address translation can take place on the basis of session information.

C-1. Internetwork Device Startup Process (Prevention of Discarding of Inter-Device Packets)

Figure 9:
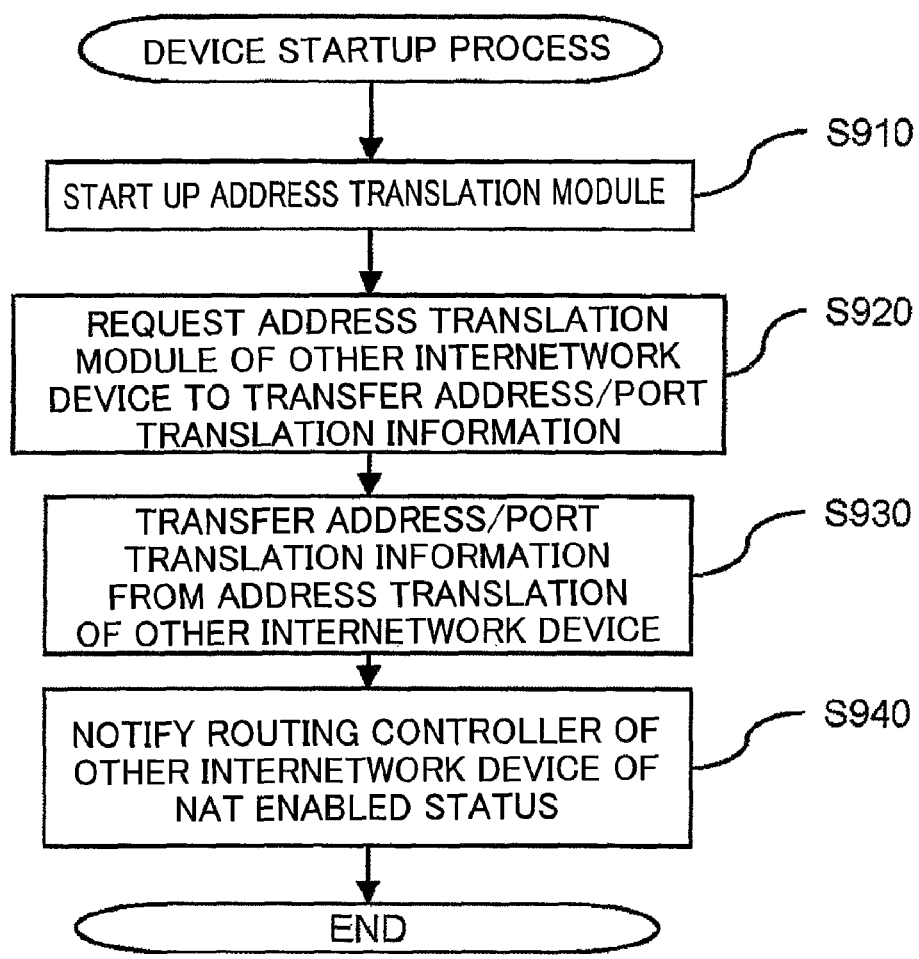
FIG. 9 is a flowchart depicting the flow of a startup process of an internetwork device 100.
Figure 10:
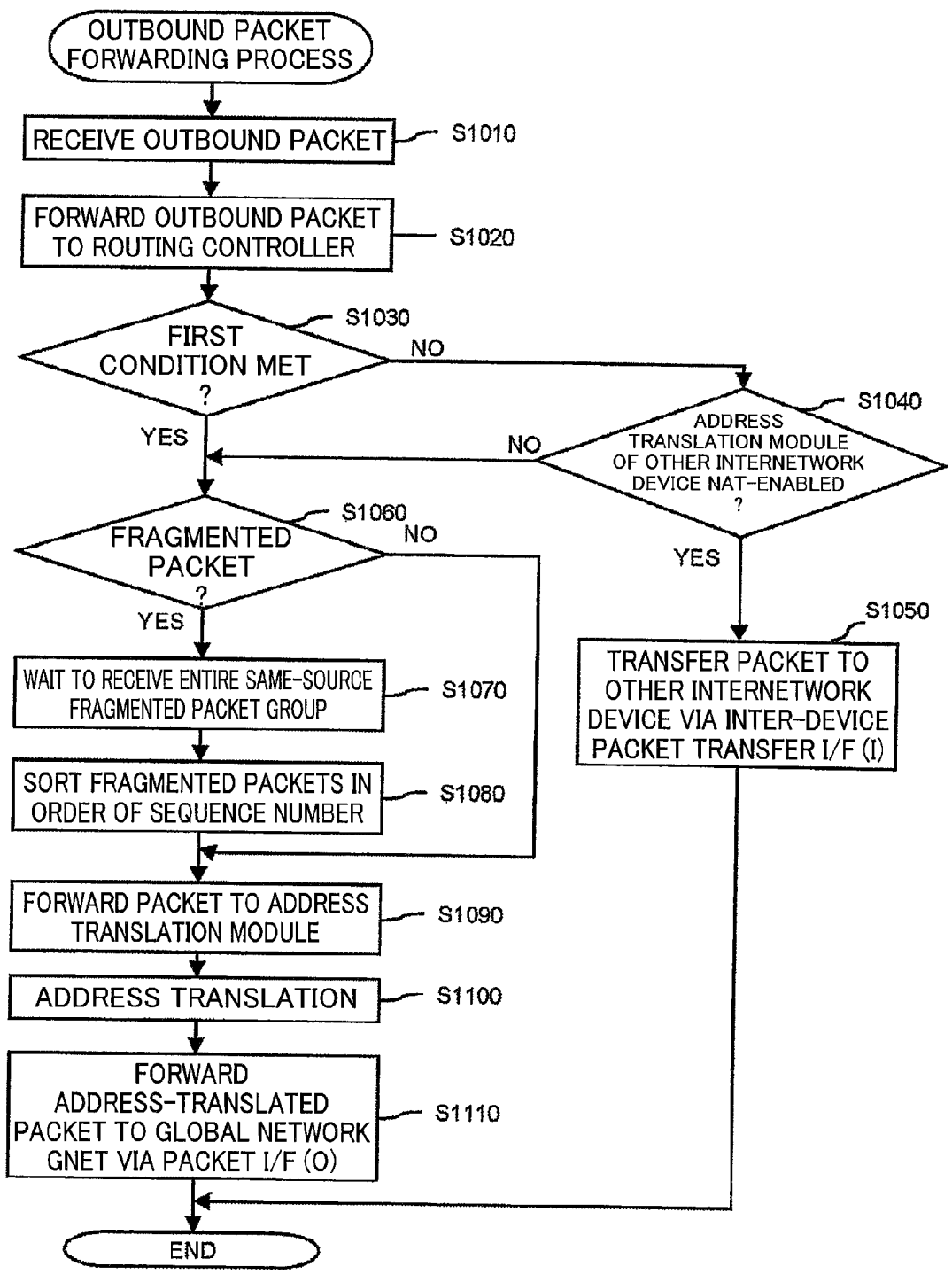
FIG. 10 is a flowchart depicting the flow of an outbound packet forwarding process.

FIG. 9 is a flowchart depicting the flow of a startup process of an internetwork device 100. FIG. 10 is a flowchart depicting the flow of an outbound packet forwarding process. The following description of the outbound packet forwarding process assumes that, in a redundant configuration with the internetwork device 100A already operating, when the internetwork device 100B is started up, outbound packets OBP sent from the local network LNET are received by the internetwork device 100A, transferred between the devices, and then sent from the internetwork device 100B to the global network GNET (see path P2 in FIG. 4).

In Step S910 (FIG. 9), functioning of the address translation module (I) 104B of the internetwork device 100B is started up.

In Step S920 (FIG. 9), upon startup, the address translation module (I) 104B of the internetwork device 100B, via the line 122, sends the address translation module (I) 104A of the other internetwork device 100A a control packet 400 requesting it to transfer address/port translation information.

Figure 13:
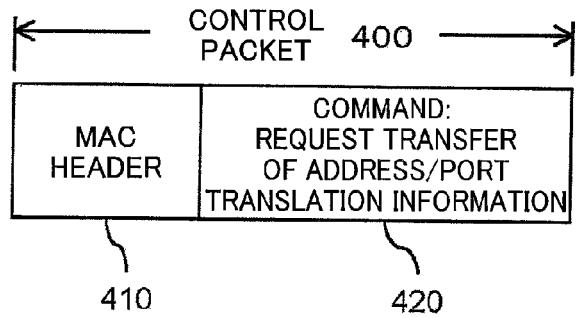
FIG. 13 is an illustration schematically depicting the control packet 400 for requesting transfer of address/port translation information.

FIG. 13 is an illustration schematically depicting the control packet 400 for requesting transfer of address/port translation information. The control packet 400 includes a MAC header 410 and a command 420 requesting transfer of address/port translation information.

In Step S930 (FIG. 9), the address translation module (I) 104A of the other internetwork device 100A that received the control packet 400 now sends the address translation module (I) 104B a control packet 500 that contains the address/port translation information currently maintained by itself, in order to transfer the address/port translation information to the address translation module (I) 104B of the internetwork device 100B via the line 122.

Figure 14:
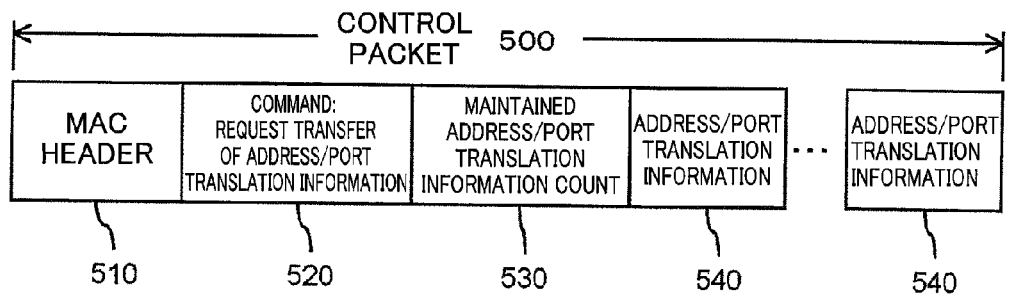
FIG. 14 is an illustration schematically depicting the control packet 500 for transferring address/port translation information.

FIG. 14 is an illustration schematically depicting the control packet 500 for transferring address/port translation information. The control packet 500 includes a MAC header 510, a command 520 for transferring address/port translation information, a maintained address/port translation information count 530, and address/port translation information 540.

In Step S940 (FIG. 9), once the address translation module (I) 104B of the internetwork device 100B has acquired the address/port translation information contained in the received control packet 500, it now sends a control packet 600 providing notification of NAT-enabled status to the routing controller 102A of the other internetwork device 100A via the line 122.

Figure 15:
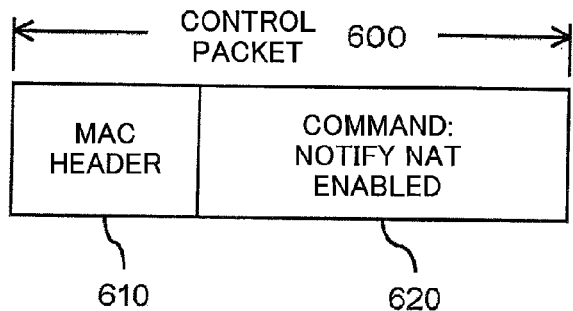
FIG. 15 is an illustration schematically depicting the control packet 600 for providing notification of NAT-enabled status.

FIG. 15 is an illustration schematically depicting the control packet 600 for providing notification of NAT-enabled status. The control packet 600 includes a MAC header 610 and a command 620 for notification of NAT-enabled status.

Through notification of NAT-enabled status by the control packet 600, the internetwork device 100B can notify the other internetwork device 100A that synchronization of address/port translation information is complete and that the address translation process is enabled.

Next, the outbound packet forwarding process in the other internetwork device 100A is described with reference to FIG. 10. The flowchart of FIG. 10 is substantially identical to the flowchart of FIG. 3 except for an additional Step S1040 between Step S130 and Step S140; parts that are not appreciably different from FIG. 3 are not described.

In Step S1010 (FIG. 10), the inside packet interface 101 of the internetwork device 100 (100A) receives an outbound packet OBP from the local network LNET. The inside packet interface 101 forwards the received outbound packet OBP to the routing controller 102 (Step S1020).

In Step S1030 (FIG. 10), the routing controller 102 determines if the received outbound packet OBP meets either the first condition or the second condition. If it is determined that the outbound packet OBP meets the second condition and not the first condition (Step S1030: NO), in Step S1040, the routing controller 102 of the internetwork device 100A determines whether the address translation module (I) 104B of the internetwork device 100B has NAT-enabled status. If determined to have NAT-enabled status (Step S1040: YES), the routing controller 102 transfers the outbound packet OBP to the other internetwork device 100B via the inside inter-device packet transfer interface 106 (Step S1050) (see path P2 in FIG. 4).

On the other hand, if determined that the outbound packet OBP meets the first condition (Step S1030: YES) or that transfer of address/port translation information is not complete and NAT is not enabled (Step S1040: NO), the routing controller 102 then determines whether the outbound packet OBP is a fragmented packet (Step S1060). If determined that the outbound packet OBP is not a fragmented packet (Step S1060: NO), the routing controller 102 forwards the outbound packet OBP to the inside address translation module 104 (Step S1090) (see path P1 in FIG. 4). The inside address translation module 104 having received the outbound packet OBP then refers to the address/port translation information and carries out address translation (translation of the source address and communication port number) (Step S1100).

If on the other hand it is determined that the outbound packet OBP is a fragmented packet, (Step S1060: YES), the routing controller 102 waits to receive all of the packets that make up the same-source fragmented packet group to which the received fragmented packet belongs (Step S1070). Through monitoring of packets forwarded from the local network LNET via the inside packet interface 101 and of packets transferred from the other internetwork device 100 via the inside redundant inter-device packet transfer interface 106, the routing controller 102 determines whether all of the packets that make up the same-source fragmented packet group have been received.

Once all of the packets that make up the same-source fragmented packet group are received, the routing controller 102 sorts all the received fragmented packets in order of sequence number (Step S1080). The routing controller 102 then forwards the fragmented packets (outbound packets OBP) in order of sequence number to the inside address translation module 104 (Step S1090) (see path P1 in FIG. 4). Once the inside address translation module 104 has received the outbound packets OBP, it references the address/port information and carries out address translation (translation of the source address and communication port number) (Step S1100).

The inside address translation module 104 forwards the address-translated outbound packets OBP to the routing controller 102, whereupon the routing controller 102 carries out routing according to the destination address, and forwards the outbound packets OBP to the global network GNET via the outside packet interface 103 (Step S1110) (see path P1 in FIG. 4).

According to the present embodiment, because the internetwork device 100A performs inter-device packet transfer only if the address translation module (I) 104B of the internetwork device 100B has NAT-enabled status, discarding of packets due to inability for address translation to take place on the internetwork device 100B can be prevented.

While the present embodiment described the outbound packet forwarding process, in the inbound packet forwarding process as well, discarding of inbound packets IBP can be prevented analogously through an additional step equivalent to Step S1040 of FIG. 10 coming between Step S430 and Step S440 of the flowchart of FIG. 6.

C-2. Internetwork Device Startup Process (Prevention of Discarding of Packets from Network by Bringing Down the Link)

Figure 11:
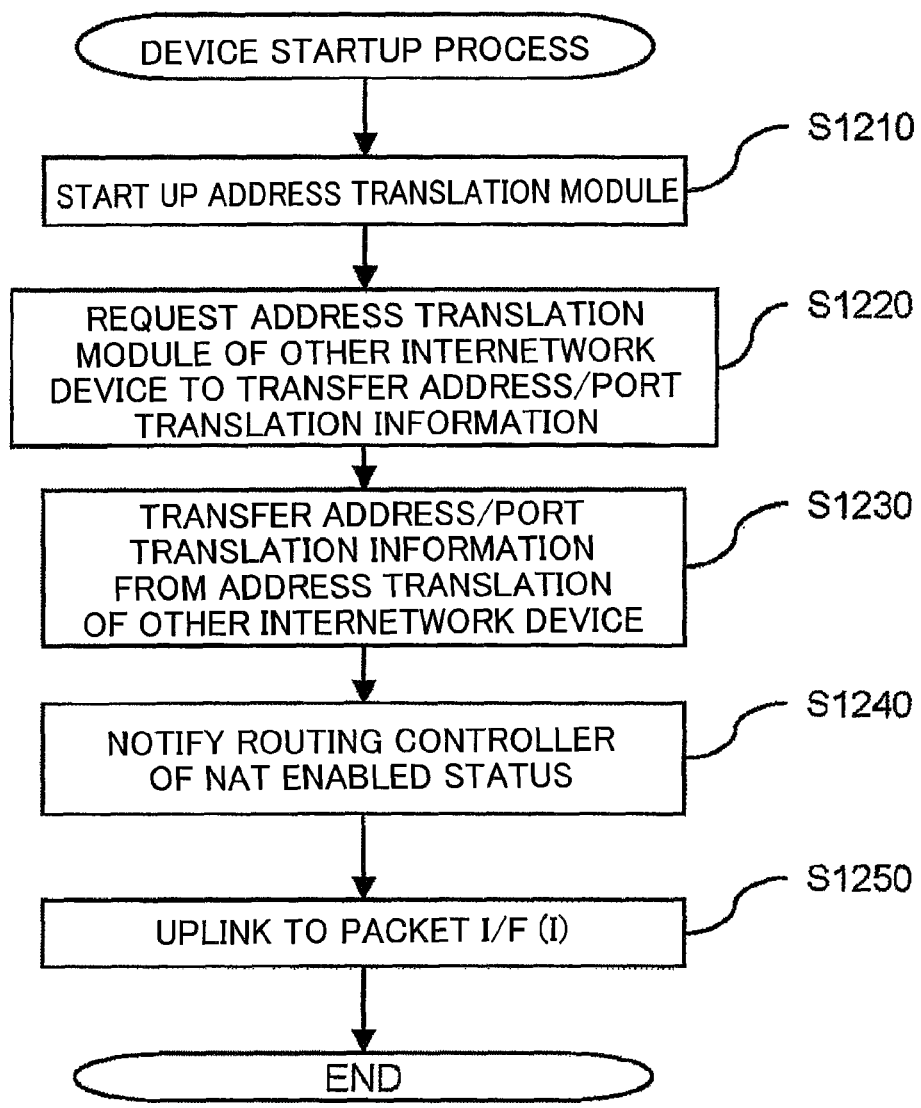
FIG. 11 is a flowchart depicting the flow of a startup process of an internetwork device.

FIG. 11 is a flowchart depicting the flow of a startup process of an internetwork device. The following description of the outbound packet forwarding process assumes that, in a redundant configuration with the internetwork device 100A already operating, when the internetwork device 100B is started up, outbound packets OBP sent from the local network LNET are received by the internetwork device 100B and sent to the global network GNET (see FIG. 4).

In Step S1210 (FIG. 11), functioning of the address translation module (I) 104B of the internetwork device 100B is started up.

In Step S1220 (FIG. 11), upon startup, the address translation module (I) 104B of the internetwork device 100B, via the line 122, sends the address translation module (I) 104A of the other internetwork device 100A a control packet 400 requesting it to transfer address/port translation information.

In Step S1230 (FIG. 11), the address translation module (I) 104A of the other internetwork device 100A that received the control packet 400 now sends the address translation module (I) 104B a control packet 500 that contains the address/port translation information currently maintained by itself, in order to transfer the address/port translation information to the address translation module (I) 104B of the internetwork device 100B via the line 122.

In Step S1240 (FIG. 11), once the address translation module (I) 104B of the internetwork device 100B has acquired the address/port translation information contained in the received control packet 500, it notifies its own routing controller 102B of NAT-enabled status.

In Step S1250 (FIG. 11), the routing controller 102B of the internetwork device 100B having received notification of NAT-enabled status uplinks to the packet I/F (I) 101B.

When the link from internetwork device 100B to the packet I/F (I) 101B is up, outbound packets OBP sent from the internetwork local network LNET are received from the internetwork device 100B through routing control in the local network LNET.

On the other hand, when the link from the internetwork device 100B to the packet I/F (I) 101B is down, outbound packets OBP sent from the local network LNET are received from the internetwork device 100A through routing control in the local network LNET.

According to the present embodiment, the internetwork device 100B upon startup uplinks to the packet I/F (I) 101B only if the address translation module (I) 104B has NAT-enabled status, thereby preventing packets from being discarded due to inability to carry out address translation of packets received from the packet I/F (I) 101B.

Additionally, while the present embodiment described the outbound packet forwarding process, in the inbound packet forwarding process as well, discarding of inbound packets IBP can be prevented analogously by uplinking to the packet I/F (O) only after the address translation module (O) 105 has finished synchronizing address/port translation information according to the flowchart of FIG. 11.

C-3. Internetwork Device Startup Process (Prevention of Discarding of Packets from Network by Route Propagation)

Figure 12:
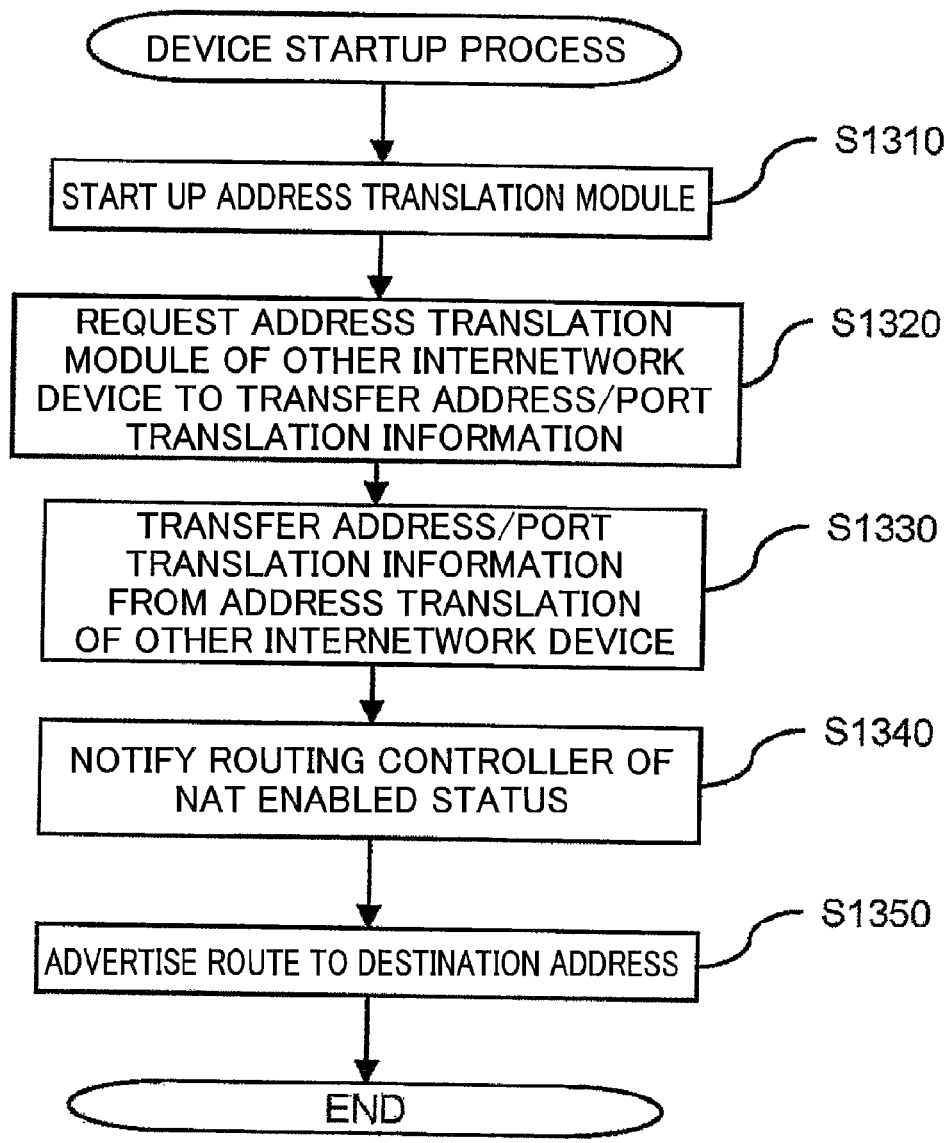
FIG. 12 is a flowchart depicting the flow of a startup process of an internetwork device.

FIG. 12 is a flowchart depicting the flow of a startup process of an internetwork device. The following description of the outbound packet forwarding process assumes that, in a redundant configuration with the internetwork device 100A already operating, when the internetwork device 100B is started up, outbound packets OBP sent from the local network LNET are received by the internetwork device 100B and sent to the global network GNET (see FIG. 4).

In Step S1310 (FIG. 12), functioning of the address translation module (I) 104B of the internetwork device 100B is started up.

In Step S1320 (FIG. 12), upon startup, the address translation module (I) 104B of the internetwork device 100B, via the line 122, sends the address translation module (I) 104A of the other internetwork device 100A a control packet 400 requesting it to transfer address/port translation information.

In Step S1330 (FIG. 12), the address translation module (I) 104A of the other internetwork device 100A that received the control packet 400 now sends the address translation module (I) 104B a control packet 500 that contains the address/port translation information currently maintained by itself, in order to transfer the address/port translation information to the address translation module (I) 104B of the internetwork device 100B via the line 122.

In Step S1340 (FIG. 12), once the address translation module (I) 104B of the internetwork device 100B has acquired the address/port translation information contained in the received control packet 500, it notifies its own routing controller 102B of NAT-enabled status.

In Step S1350 (FIG. 12), the routing controller 102B of the internetwork device 100B having received notification of NAT-enabled status now advertises to the local network LNET the route to the destination address via the packet interface I/F (I) 101B.

With the route from the routing controller 102B of the internetwork device 100B advertised in this way, outbound packets OBP sent from the internetwork local network LNET are received from the internetwork device 100B through routing control in the local network LNET.

On the other hand, if the route from the routing controller 102B of the internetwork device 100B is not advertised, outbound packets OBP sent from the internetwork local network LNET are received from the internetwork device 100A through routing control in the local network LNET.

According to the present embodiment, upon startup, the routing controller of the internetwork device 100B advertises to the local network LNET the route via the packet I/F (I) 100B only if NAT is enabled, thereby preventing packets from being discarded due to inability to carry out address translation of packets received from the packet I/F (I) 101B.

Additionally, while the present embodiment described the outbound packet forwarding process, in the inbound packet forwarding process as well, discarding of inbound packets IBP can be prevented analogously by having the routing controller advertise to the global network GNET the route via the packet I/F (O) after the address translation module (O) 105 has finished synchronizing the address/port translation information according to the flowchart of FIG. 12.

B. Modified Embodiments

The present invention is not limited to the embodiments and aspects described above. The present invention may be worked in various aspects within limits that involve no departure from the spirit of the invention; for example, the following modifications are possible.

B1. Modified Embodiment 1

In the preceding embodiment, a combination of the conditions that "the source address is an even number" and "the source address is an odd number" are employed as the combination of the first condition and the second condition; however, other combinations are possible. For example, a combination of conditions that "the ones position of the source address is any digit from 0 to 4" and "the ones position of the source address is any digit from 5 to 9" may be employed as the combination of the first condition and the second condition. Alternatively, a combination of conditions that "the ones position of the source address is either 0 or 1" and "the ones position of the source address is any digit from 2 to 9" may be employed. It is preferable to monitor the load on each internetwork device 100 and to establish a combination of conditions such the load assigned to each internetwork device 100 may be adjusted to the desired value (e.g. so that their respective loads are equal). The combination of conditions may be reset at periodic intervals or on an as needed basis.

As yet another alternative, a combination of the conditions that "the destination address is an even number" and "the destination address is an odd number" may be employed as the combination of the first condition and the second condition. Because all of the fragmented packets contained in a same-source fragmented packet group share the same destination address, this combination of conditions also results in the packets meeting the same condition. Other combinations of a first condition and a second condition that relate to information shared in common by all fragmented packets of a same-source fragmented packet group could be adopted as well. However, where a combination of conditions relating to the source address are employed as the first and second conditions as taught in the preceding embodiment, all packets sent from a given terminal, not just fragmented packets, are collected by the same internetwork device 100, which is preferable in terms of packet management.

B2. Modified Embodiment 2

While the preceding embodiment described an example of a redundant configuration in which two internetwork devices 100 with identical functions and features operate simultaneously (Double ACT configuration), the present invention may be implemented in any redundant configuration in which N (N is an integer equal to 3 or greater) internetwork devices 100 operate simultaneously. In this case, a number N of conditions ranging from a first condition to an N-th condition would be established in manner analogous to the preceding embodiment, so that any packet meets one of the N conditions, and all of the fragmented packets included in a same-source fragmented packet group meet the same condition. Packets received by any one of the internetwork devices 100 are then distributed to any of the N internetwork devices 100 based on the determination as to which of the N conditions they meet. With such an arrangement, fragmented packets can be processed correctly in instances where address translation takes place in a configuration with N internetwork devices operating simultaneously.

B3. Modified Embodiment 3

Some of the features implemented through hardware in the preceding embodiment may be replaced by software, and conversely some of the features implemented through software may be replaced by hardware.

What is claimed is:

1. A first internetwork device comprising:
   a receiving module configured to receive a packet from a first network;
   an inter-device packet transfer interface configured to carry out inter-device packet transfer involving transfer of a packet to or from a second active internetwork device;
   an inter-device packet transfer controller configured to control packet transfers via the inter-device packet transfer interface between the first active internetwork device and the second active internetwork device such that multiple fragmented packets created from a same original packet are collected by either the first internetwork device or the second internetwork device, the fragmented packets being packets created by dividing a single original packet into multiple parts when one of the fragment packets is received via the receiving module;
   an address translation module configured to translate between a local address used within a specific network and a global address used across multiple networks, for at least one of a source address and a destination address of a packet; and
   a transmission module configured to transmit an address-translated packet to a second network.

2. A first internetwork device according to claim 1, wherein the inter-device packet transfer controller determines whether to transfer a received packet to the other internetwork device, based on whether a received packet meets a specific condition relating to first information contained in the packet, the first information being information of which fragmented packets created from the same original packet have identical value.

3. A first internetwork device according to claim 2, wherein the first information is at least one of a source address and a destination address.

4. A first internetwork device according to claim 2, wherein the inter-device packet transfer controller establishes the specific condition based on loads on the internetwork device and the other internetwork device.

5. A first internetwork device according to claim 1, wherein the address translation module translates between a local address and a global address for at least one of a combination of a source address and a communication port number, and a combination of a destination address and a communication port number.

6. A first internetwork device according to claim 1, wherein the inter-device packet transfer controller detects a fragmented packet among received packets, and determines whether all fragmented packets created from the same original packet as the detected fragmented packet have been successfully collected by the same internetwork device, and
the address translation module performs address translation of the fragmented packet once successful collection has been determined.

7. A first internetwork device according to claim 1, wherein the address translation module maintains address/port translation information indicating corresponding relation between a combination of an address and a communication port on the first network side and a combination of an address and a communication port on the second network side, and synchronizes the address/port translation information with the other internetwork device, and
the inter-device packet transfer controller performs inter-device packet transfer once synchronization of the address/port translation information has been performed.

8. A first internetwork device according to claim 7, wherein at least one of the receiving module and the transmission module uplinks once synchronization of the address/port translation information has been performed.

9. A first internetwork device according to claim 7, further comprising:
a routing controller configured to control packet routing, wherein the routing controller advertises routing information once synchronization of the address/port translation information has been performed.

* * * * *